United States Patent [19]

Burzin et al.

[11] 4,101,524

[45] Jul. 18, 1978

[54] METHOD FOR THE PRODUCTION OF COLORLESS POLYESTER AMIDES

[75] Inventors: Klaus Burzin; Rainer Feldmann, both of Marl, Fed. Rep. of Germany

[73] Assignee: Chemische Werke Hüls Aktiengesellschaft, Marl, Fed. Rep. of Germany

[21] Appl. No.: 717,358

[22] Filed: Aug. 24, 1976

[30] Foreign Application Priority Data

Sep. 24, 1975 [DE] Fed. Rep. of Germany ....... 2542467

[51] Int. Cl.$^2$ .................... C08G 63/22; C08G 63/68
[52] U.S. Cl. ................................................ 528/288
[58] Field of Search ................ 260/75 M, 75 N, 78 R

[56] References Cited

U.S. PATENT DOCUMENTS

| | | | |
|---|---|---|---|
| 3,185,668 | 5/1965 | Meyer et al. ................ | 260/75 M |
| 3,440,218 | 4/1969 | Caldwell ................ | 260/75 N X |
| 3,546,178 | 12/1970 | Caldwell et al. ................ | 260/75 N |
| 3,828,010 | 8/1974 | Davis et al. ................ | 260/75 N |
| 3,836,574 | 9/1974 | Achsel et al. ................ | 260/75 M X |

OTHER PUBLICATIONS

Yen, "Polyamides Other than Nylons 6 and 66", Process Economics Program, Stanford Research Institute, Menlo Park, Ca., Nov. 1974.

*Primary Examiner*—Walter C. Danison
*Attorney, Agent, or Firm*—Gilbert L. Wells

[57] ABSTRACT

The production of polyester amides based on dicarboxylic acids and/or the esters thereof, primary diamines, and polyhydric alcohols and/or aminocarboxylic acids or lactams, by poly-condensing the mixture under heating in the presence of water, while distilling off the volatile components, and recondensation under reduced pressure is improved so that colorless polyester amides are produced. In a first stage a monomer mixture is preliminarily condensed in the presence of about 3 - 20 percent of water, based on the sum total of the polyamide-forming components, under a pressure of about 14 - 25 bars, at temperatures of about 200° - 300° C and for a time period of about 4 - 12 hours. In a second stage, the mixture is completely condensed, after removal of the water, under a reduced pressure of about 0.01 - 100 mbar at temperatures of about 230° - 300° C and for a period of time of about 1 - 12 hours.

6 Claims, No Drawings

METHOD FOR THE PRODUCTION OF COLORLESS POLYESTER AMIDES

BACKGROUND OF THE INVENTION

The present invention relates to a method for the production of colorless polyester amides based on dicarboxylic acids and/or their esters, primary diamines, and polyhydric alcohols and/or aminocarboxylic acids or lactams, by polycondensing the mixture with heating in the presence of water while distilling off the volatile components, and recondensation under reduced pressure.

Polyester amides have been known for a long time. In principle, they are prepared by two different methods. The synthesis is accomplished either by the use of low molecular starting components, such as for example, aminoalcohols, lactones, diols, dicarboxylic acids, aminocarboxylic acids, lactams, and diamines, or by reactions between polyamides and polyesters, optionally in the presence of catalysts at elevated temperatures.

The state of the art of polyester amide production may be ascertained by reference to "Polyamides Other Than Nylons 6 and 66," Part II, Stanford Research Institute, Menlo Park, Calif., November 1974, particulary the List of Patents on Polyester Amides, pp, 417-422; U.S. Pat. Nos. 2,856,385 and 3,160,609; German Published Applications Nos. 1,745,448 and 2,236,041; and British Pat. No. 959,671, the disclosures of which are incorporated herein.

Polyester amides heretofore have hardly been used under practical conditions. This is essentially due to the fact that discolorations occur at temperatures of above 200° C during longer heating of the starting materials and this discoloration is attributed to secondary reactions not examined in detail heretofore.

To avoid such discolorations, the following methods are known to the prior art:

1. The polycondensation temperature is lowered as disclosed in German Published Application No. 1,745,448. However, this procedure does not result in molecular weights of above 10,000 which are required for practical application.

2. The use of reactive catalysts. The critical temperature limit is exceeded, but the condensing periods are kept to a minimum. Examples of effective catalyst systems used are tetraphenyl tin as disclosed in U.S. Pat. No. 3,160,609, as well as alkoxy titanates as disclosed in British Pat. No. 959,671, and alkali hydrogen hexaalkoxy titanates as disclosed in U.S. Pat. No. 2,856,385. The brief reaction times, for example 30 - 90 minutes, cannot be maintained in the case of a discontinuous process in a stirred autoclave, since the heating times and the duration of the discharging of the polymer melt alone exceed the above time limits by far. Besides, residues of the product in the reactor and in the feed conduits, which are under multiple thermal load, strongly discolor the subsequent batches. This can only be prevented by thorough decocting after each batch and this represents a considerable loss in capacity and is connected with increased expenses.

3. The use of 2,2-dimethyl-1,3-propanediol (neopentyl glycol) as the diol component is disclosed in German Published Application No. 2,236,041. The production of the polyester amides is effected by melt condensation of diamines and dicarboxylic acids and/or ω-aminocarboxylic acids or lactams, preferably in the presence of catalysts and/or stabilizers and further additives, the diol employed being exclusively neopentyl glycol. The avoidance of discoloration is thought to be due to the structural peculiarity of neopentyl glycol (no H-atoms in the β-position with respect to the OH-group), so that the thermal ester cleavage is impossible. When diols not endowed with this special structure are used, such as for example, ethylene glycol, 1,3-propanediol, 1,4-butanediol, 1,6-hexanediol, 1,12-dodecanediol, 1,4-bis(-hydroxymethyl) cyclohexane, unattractive, dirty brown products are obtained, the discoloration of which is intensified upon further thermal loading.

SUMMARY OF THE INVENTION

Having in mind the limitations of the prior art as existing heretofore, it has been impossible to produce colorless polyester amides from lactams or aminocarboxylic acids and/or diamines and dicarboxylic acids and diols and dicarboxylic acids or the esters thereof, in any desired composition, in discontinuous systems, without having to employ specific catalysts and/or stabilizers. It is therefore an object of the present invention to produce these colorless polyester amides.

This object has now been attained surprisingly by heating the monomer mixture, in a first stage, under pressure to about 220°–300° C in the presence of about 3 - 20 percent by weight of water, based on the sum total of the polyamide-forming components; and in a second stage completely condensing the reaction mixture after removal of the water, at temperatures of about 230°–300° C under a reduced pressure of about 100 - 0.01 mbar.

DESCRIPTION OF THE PREFERRED EMBODIMENTS

The temperature required in the first stage is dependent on the type of polyamide-forming starting materials. Thus, it is possible, for example, to conduct the reaction of adipic acid hexamethylenediamine with the polyester-forming components in the first stage at lower temperatures than the corresponding reaction with, for example, laurolactam which, as is known, can only be reacted with sufficient speed at temperatures of above 265° C. Advantageously, the temperature of the first stage is 250°–280° C.

The temperature required for the condensation, the quality of the vacuum, and the required time depend on the reactivity, as well as the desired final viscosity of the polyester amides. If necessary, it is possible with the aid of a few routine experiments to set these variables so that polyester amides having the desired composition and viscosity are obtained. Advantageously, temperatures of about 250°–280° C and pressure of about 30 - 0.1 mbar are employed in the second stage.

In the first stage, the heating step is carried out generally for about 4 - 12 hours, advantageously for about 6 - 10 hours, with internal pressure. The internal pressure reaches up to about 25 bar. This internal pressure depends on the polymerization temperature, the amount of water utilized, and the ratio of volume in the gas space of the pressure vessel to the volume of the monomer/water mixture. In particular, pressures of about 14 - 25, especially about 16 - 20 bar are used. Following the preliminary polymerization under pressure, the water is first of all practically entirely removed from the reaction by expanding the gas in the reaction vessel with the application of heat. The preliminary condensate is then heated, under a reduced pressure of about 100 - 0.01 mbar, preferably about 30 - 0.1 mbar, to about 230°-300° C, preferably about 250°-280° C. The duration of this step depends on the desired viscosity and the time period ranges generally between about 1 and 12 hours, preferably between about 2 and 8 hours. In special cases, e.g., when the polyester proportion is minor, it is possible to omit a recondensation step after removal of the water of the first stage. The polycondensation is conducted in both stages under an oxygen-free protective gas, such as nitrogen.

It is possible to use, in the process of this invention, as the polyamide-forming components:
lactams of the general formula

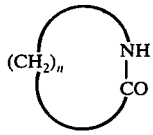

where $n = 5$ to $n = 12$, and/or the corresponding aminocarboxylic acids of the general formula $H_2N-(CH_2)_n-COOH$ where $n = 5$ to $n = 12$; aliphatic primary diamines of the general formula $H_2N-(CH_2)_m-NH_2$ where $m = 2 - 13$; as well as branched and cycloaliphatic diamines such as, for example, 2,2,4-trimethylhexamethylenediamine, isophoronediamine, and 1,4-bis(aminomethyl)-cyclohexane, together with aliphatic dicarboxylic acids of the general formula $HOOC-(CH_2)_o-COOH$ where $o = 4 - 11$, or cycloaliphatic dicarboxylic acids, such as, for example, hexahydroterephthalic acids; as well as aromatic dicarboxylic acids, such as terephthalic acid and/or isophthalic acid. The starting materials can be used individually or in a mixture with one another.

As the starting materials for the ester-forming structural units, it is possible to employ aliphatic diols of the general formula $HO-(CH_2)_p-OH$ where $p = 2 - 12$, as well as cycloaliphatic diols, e.g., 1,4-bis(hydroxymethyl)cyclohexane together with the aliphatic, cycloaliphatic, and aromatic dicarboxylic acids which are also used for the polyamide-forming components, as well as the esters and/or oligo esters thereof. Here again, the starting substances can be utilized individually or in mixtures with each other.

The oligo esters are prepared by reesterification of the dicarboxylic acid dimethyl esters in a separate reactor with the corresponding diols, in the usual manner at about 180°-220° C under nitrogen and in the presence of a reesterification catalyst, e.g., zinc acetate or calcium acetate or tetraalkyl titanate.

Preferably, the following compounds are to be employed:
as the lactams: caprolactam, capryllactam, and laurolactam; as the aminocarboxylic acids: ω-aminohexanoic acid, ω-aminooctanoic acid, ω-aminoundecanoic acid, and ω-aminododecanoic acid;
as the diamines: hexamethylenediamine, octamethylenediamine, and dodecamethylenediamine;
as the dicarboxylic acids: succinc acid, adipic acid, pimelic acid, suberic acid, azelaic acid, sebacic acid, dodecanedioic acid, hexahydroterephthalic acid, terephthalic acid, and isophthalic acid;
as the oligo esters: the reaction products of the dimethyl esters, of terephthalic acid and hexahydroterephthalic acid with diols;
as the diols: 1,3-propanediol, 1,6-hexanediol, 1,12-dodecanediol, and 1,4-bis(hydroxymethyl) cyclohexane.

In principle, ethylene glycol and 1,4-butanediol are likewise suitable for the production of polyester amides. However, in the case of ethylene glycol, one must consider that a portion thereof evaporates during expansion. Here, equivalency is reestablished by subsequent feeding or by providing an excess. When 1,4-butanediol is used, a part thereof is withdrawn from the polycondensate by the formation of tetrahydrofuran, so that here again an excess must be employed or additional 1,4-butanediol must be fed to the reaction mixture.

The quantitative ratios, the type of starting materials, and the reaction conditions determine the physical properties of the thus obtained polyester amides. As resulted from differential thermoanalysis investigations of partially crystalline polyester amides, the basic polyester and polyamide building blocks are distributed statistically. The proportion of ester groups and amide groups can be varied as desired from 1 : 99 to 99 : 1 percent by weight, without the occurrence of discolorations. The polyester amides can also contain additives fed before, during, or after the polycondensation. Examples for such additives are catalysts, e.g., phosphoric acid, zinc acetate, calcium acetate, tetraalkyl titanates, pigments, or flatting agents, e.g., titanium dioxide.

The polyester amides of the present invention can be used for the manufacture of molded articles, such as sheets, fibers, or injection molded articles, or as fusion adhesives.

The present invention is explained hereinbelow in greater detail with reference to the specific examples. The relative solution viscosity was measured at 25° C in m-cresol at a concentration of 0.5 g/100 ml. The softening points were determined on a Kofler heating bench.

EXAMPLE 1

800 g of laurolactam was heated, together with 146 g of adipic acid, 144 g of 1,4-bis(hydroxymethyl)cyclohexane, and 80 g of water, for 8 hours to 280° C in an autoclave and during this step, an internal pressure of about 19 bar was ambient. A second step was carried out with an expansion conducted during 1 hour, nitrogen being passed over the mixture for one-half hour, and a water jet vacuum of about 70 mbar being applied for 2 hours. The second step was carried out at a temperature of 280° C. The mixture was then discharged and granulated, thus obtaining colorless granules. Softening range: 133° C. $\eta_{rel}$:1.36.

EXAMPLE 2

800 g of laurolactam was reacted in accordance with the process described in Example 1, together with 230 g of dodecanedioic acid, 76 g of 1,3-propanediol, and 80 g of water, thus producing colorless granules. Softening range: 139° C $\eta_{rel}$:1.23.

EXAMPLE 3

800 g of laurolactam was reacted, together with 230 g of dodecanedioic acid and 110 g of 1,6-hexanediol, and 80 g of water in accordance with the process disclosed in Example 1; a colorless product was likewise obtained. Softening range: 124° C. $\eta_{rel}$:1.28.

EXAMPLE 4

800 g of laurolactam was reacted, together with 146 g of adipic acid, 202 g of 1,12-dodecanediol, and 80 g of water, in accordance with the process described in Example 1, thus producing colorless granules. Softening range: 144° C. $\eta_{rel}$:1.36.

EXAMPLE 5

800 g of laurolactam was reacted, together with 166 g of isophthalic acid, 144 g of 1,4-bis(hydroxymethyl)-cyclohexane, and 80 g of water, according to the process set forth in Example 1, obtaining a transparent granulated material having a slightly yellowish tinge. Softening range: 140° C. $\eta_{rel}$:1.40.

EXAMPLE 6

800 g of laurolactam was reacted, together with 83 g of terephthalic acid, 83 g of isophthalic acid, 144 g of 1,4-bis(hydroxymethyl)-cyclohexane, and 80 ml of water, in accordance with the procedure indicated in Example 1, thus obtaining a transparent, almost colorless product. Softening range: 132° C. $\eta_{rel}$:1.34.

EXAMPLE 7

7480 g of laurolactam was reacted, together with 460 g of dodecanedioic acid, 288 g of 1,4-bis(hydroxymethyl)-cyclohexane, and 370 ml of water, according to the process of Example 1, thus obtaining a colorless granulated material. Softening range: 170° C. $\eta_{rel}$:1.48.

EXAMPLE 8

7480 g of laurolactam was reacted, together with 920 g of dodecanedioic acid, 576 g of 1,4-bis(hydroxymethyl)-cyclohexane, and 405 ml of water, according to the process disclosed in Example 1, thus producing colorless granules. Softening range: 170° C. $\eta_{rel}$:1.69.

EXAMPLE 9

7480 g of laurolactam was reacted, together with 1380 g of dodecanedioic acid, 864 g of 1,4-bis(hydroxymethyl)-cyclohexane, and 370 ml of water, in accordance with the procedure of Example 1. A colorless granulated material was produced. Softening range: 163° C. $\eta_{rel}$:1.34.

EXAMPLE 10

7480 g of laurolactam was reacted, together with 1840 g of dodecanedioic acid and 1152 g of 1,4-bis(hydroxymethyl)-cyclohexane, and 370 ml of water according to the process described in Example 1, thus obtaining colorless granules. Softening range: 161° C. $\eta_{rel}$:1.33.

EXAMPLE 11

7480 g of laurolactam was reacted, together with 2320 g of dodecanedioic acid and 1440 g of 1,4-bis(hydroxymethyl)-cyclohexane, according to the process described in Example 1, thus obtaining colorless granules. Softening range: 154° C. $\eta_{rel}$:1.34.

EXAMPLE 12

1009 g of laurolactam was polycondensed with 621 g of dodecanedioic acid, 388 g of 1,4-bis(hydroxymethyl)-cyclohexane, 1.18 g of phosphoric acid, and 98 ml of water for 8 hours at 270° C and under a steam pressure of about 19 bar. The mixture was expanded during 1 hour, and nitrogen was passed thereover for one-half hour. Thereupon, a vacuum of 0.4 mbar was applied, and respectively one-third of the batch was discharged after 1 hour at a temperature of 270° C, after 2 hours at a temperature of 270° C, and after 3 hours at a temperature of 270° C respectively. All of the samples were entirely colorless.

Sample I. Softening range: 134° C $\eta_{rel}$:1.41

Sample II: Softening range: 139° C $\eta_{rel}$:1.62

Sample III: Softening range: 160° C $\eta_{rel}$:1.75

EXAMPLE 13

639 g of laurolactam, 639 g of caprolactam, 367 g of dodecanedioic acid, 230 g of 1,4-bis(hydroxymethyl)-cyclohexane, and 80 g of water were reacted according to the process described in Example 1, thus obtaining a colorless product. Softening range: 108° C. $\eta_{rel}$:1.28.

EXAMPLE 14

1120 g of laurolactam, 480 g of caprolactam, 460 g of dodecanedioic acid, 288 g of 1,4-bis(hydroxymethyl)-cyclohexane, and 160 g of water were reacted as in the process described in Example 1, thus obtaining a colorless product. Softening range: 156° C. $\eta_{rel}$:1.28.

EXAMPLE 15

800 g of caprolactam, 230 g of dodecanedioic acid, 144 g of 1,4-bis(hydroxymethyl)-cyclohexane, and 80 g of water were reacted according to the process disclosed in Example 1. A colorless product was obtained. Softening range: 166° C. $\eta_{rel}$:p.21.

EXAMPLE 16

229 g of adipic acid/hexamethylenediamine salt, 621 g of dodecanedioic acid, 388 g of 1,4-bis(hydroxymethyl)-cyclohexane, 0.73 g of phosphoric acid, and 98 ml of water were reacted as in the process of Example 1, thus obtaining a tacky, colorless product. Softening range: 126° C. $\eta_{rel}$:1.21.

EXAMPLE 17

873 g of adipic acid/hexamethylenediamine salt, 230 g of dodecanedioic acid, 144 g of 1,4-bis(hydroxymethyl)-cyclohexane, 0.73 g of phosphoric acid, and 100 ml of water were reacted according to the process indicated in Example 1. A colorless product was obtained. Softening range: 201° C. $\eta_{rel}$:1.39.

EXAMPLE 18

873 g of aminoundeconoic acid was reacted, together with 230 g of dodecanedioic acid, 144 g of 1,4-bis(hydroxymethyl)-cyclohexane, 0.73 g of phosphoric acid, and 100 ml of water, in accordance with the method of Example 1, thus obtaining a colorless product. Softening range: 161° C. $\eta_{rel}$:1.37.

EXAMPLE 19

1798 g of laurolactam, 460 g of dodecanedioic acid, 310 g of ethylene glycol, 1.51 g of phosphoric acid, and 116 ml of water were reacted according to the process disclosed in Example 1, thus obtaining a practically colorless product. Softening range: 150° C. $\eta_{rel}$:1.21.

EXAMPLE 20

1600 g of laurolactam, 460 g of dodecanedioic acid, 236 g of 1,6-hexanediol, 1.34 g of phosphoric acid, and 96 ml of water were polycondensed for 8 hours at 280°

C and under an excess pressure of about 19 bar. An expansion step was conducted for 1 hour, nitrogen was passed over the mixture for one-half hour, and an evacuation was carried out for 4 hours to 0.6 mbar, at a temperature of 270° C. A colorless product was discharged and granulated. Softening range: 158° C. $\eta_{rel}$:1.83.

EXAMPLE 21

144 g of 1,4-bis(hydroxymethyl)-cyclohexane was heated under nitrogen together with 200 g of dimethyl hexahydroterephthalate in the presence of 0.2 g of zinc acetate for 3 hours to 190°–200° C. In this was, 32 g of methanol was split off. Subsequently, 805 g of laurolactam and 60 ml of water were added, and the mixture was polycondensed for 8 hours at 270° C and under an internal pressure of about 19 bar. An expansion was conducted during 1 hour, nitrogen was passed over the mixture for one-half hour, and the mixture was then evacuated for 2 hours under a water-jet vacuum (about 70 mbar) at a temperature of 270° C. A colorless, transparent product was obtained. Softening range: 178° C. $\eta_{rel}$:1.62.

EXAMPLE 22

97 g of dimethyl terephthalate and 144 g of 1,4-bis(hydroxymethyl)-cyclohexane were heated with 0.1 g of titanium tetraisopropylate for 3 hours under nitrogen to 200° C. In this procedure, 16 g of methanol was split off. Subsequently, 83 g of isophthalic acid, 800 g of laurolactam, and 80 ml of water were added thereto. The polycondensation was carried out as described in Example 21, thus obtaining a practically colorless product. Softening range: 140° C. $\eta_{rel}$:1.44.

COMPARATIVE EXAMPLE 1a 25.92 g of 1,4-bis(hydroxymethyl)-cyclohexane, 26.28 g of adipic acid, 80.0 g of caprolactam, and 8.0 g of adipic acid/hexamethylenediamine salt were heated, together with 50 g of water, under nitrogen first for 1 hour to 100° C, during which step most of the water was evaporated. Then, 40 mg of butyl titanate was added thereto and the temperature continuously raised within 5 hours to 270° C. A vacuum of 15 mbar was applied for 2 hours. A viscous, brown product was thus obtained which was further discolored when the heating was continued for a longer period of time. Melting range: 140° C. $\eta_{rel}$:1.32.

COMPARATIVE EXAMPLE 1b

Comparative Example 1a was repeated, but without the addition of butyl titanate. The color was just as poor.

COMPARATIVE EXAMPLE 2

30.0 g of adipic acid/hexamethylenediamine salt, 18.47 g of dodecanedioic acid, and 11.53 g of 1,4-bis(hydroxymethyl)-cyclohexane were heated for 2 hours under nitrogen to 200° C, thus splitting off 10 ml of water. Subsequently, the mixture was heated for 5 hours to 230° C and evacuated for 3 hours to 20 mbar. A caramel-colored product was obtained. Softening range: 200° C. $\eta_{rel}$:1.35.

We claim:
1. A method for the production of colorless polyester amides from monomer starting materials selected from the group consisting of dicarboxylic acids, esters of dicarboxylic acids, primary diamines, polyhydric alcohols and aminocarboxylic acids; esters of dicarboxylic acids, primary diamines and aminocarboxylic acids; dicarboxylic acids, esters of dicarboxylic acids, primary diamines and lactams; esters of dicarboxylic acids, primary diamines and lactams; dicarboxylic acids, esters of dicarboxylic acids, primary diamines and aminocarboxylic acids; or esters of dicarboxylic acids, primary diamines, polyhydric alcohols and aminocarboxylic acids comprising:
 (a) condensing said starting materials in a first condensing stage in the presence of about 3 to 20 percent by weight of added water based on the total weight of polyamide forming starting materials under a pressure of about 14 to 25 bar and at a temperature of about 220°–300° C:
 (b) removing said water from said first condensing stage; and
 (c) in a second condensing stage completely condensing said starting materials at a reduced pressure of about 0.91 to 100 mbar and at a temperature of about 230° to 300° C.
2. The method of claim 1, wherein a temperature of 250°–280° C is employed in the first and second stages.
3. The method of claim 2, wherein a reduced pressure of 0.1 – 30 mbar is utilized in the second stage.
4. The method of claim 3, wherein said pressure of said first stage is about 16–20 bar.
5. The method of claim 1, wherein said first stage is carried out for a period of about 1 to 12 hours.
6. The method of claim 4, wherein said first stage is carried out for a period of about 6 to 10 hours and said second stage is carried out for a period of about 2 to 8 hours.

* * * * *